April 20, 1926.

L. B. JONES ET AL

HEADLIGHT

Filed August 5, 1920

April 20, 1926.
L. B. JONES ET AL
HEADLIGHT
Filed August 5, 1920
1,581,926
4 Sheets-Sheet 2
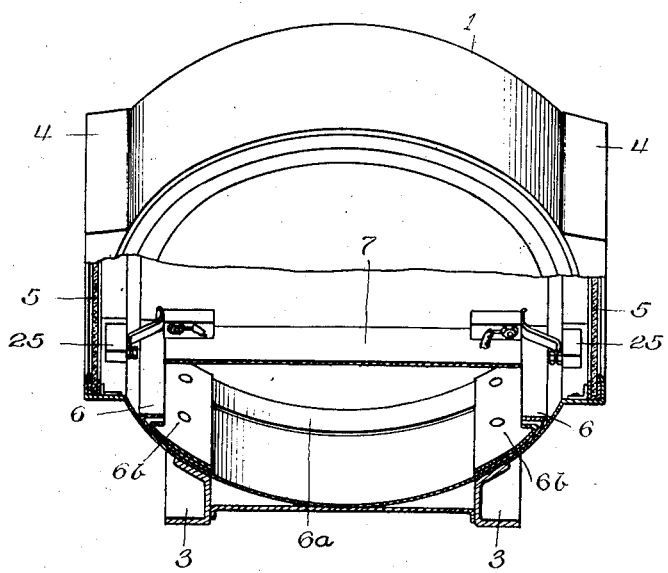
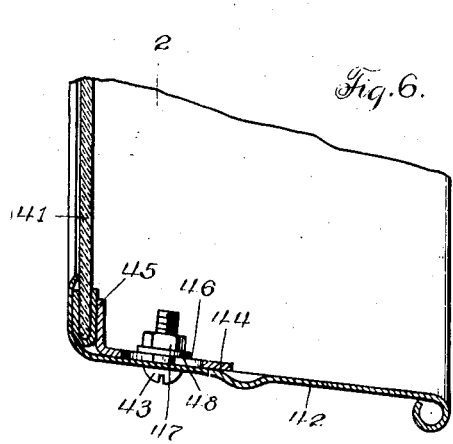
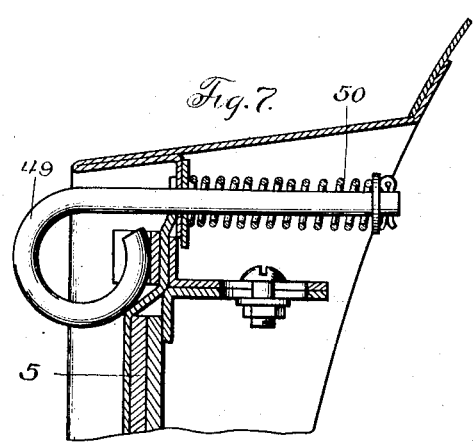
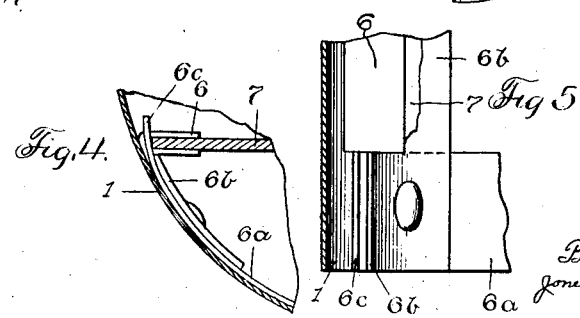

April 20, 1926.
L. B. JONES ET AL
1,581,926
HEADLIGHT
Filed August 5, 1920  4 Sheets-Sheet 3
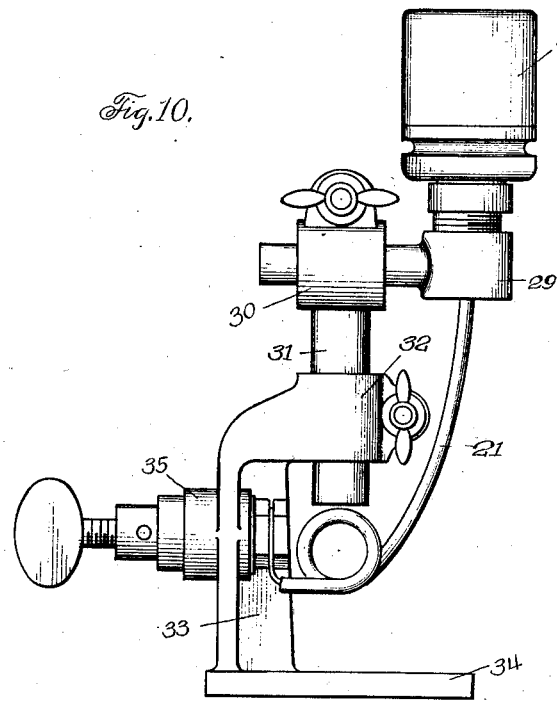
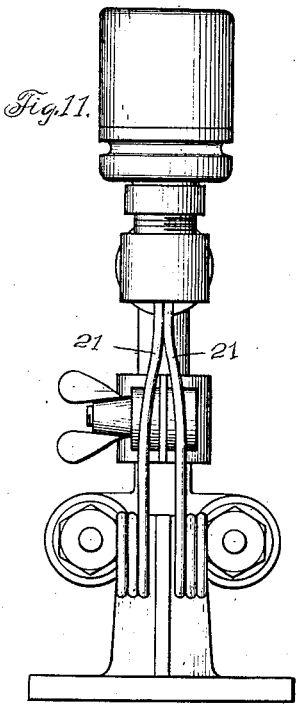
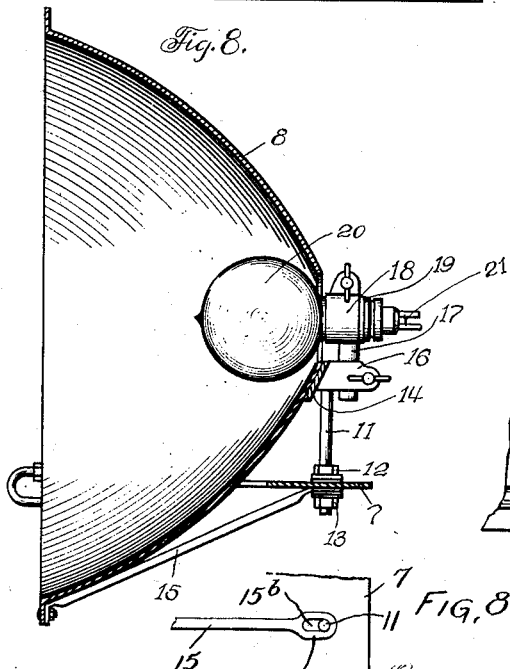
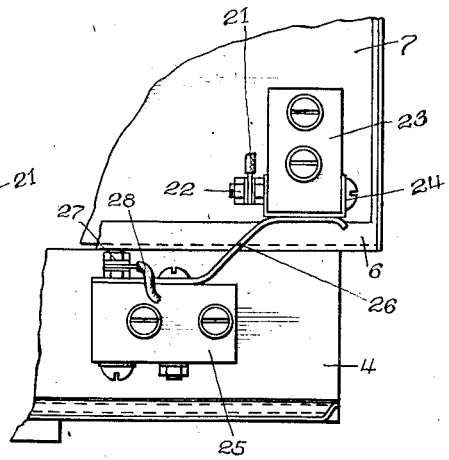

April 20, 1926.
L. B. JONES ET AL
1,581,926
HEADLIGHT
Filed August 5, 1920    4 Sheets-Sheet 4
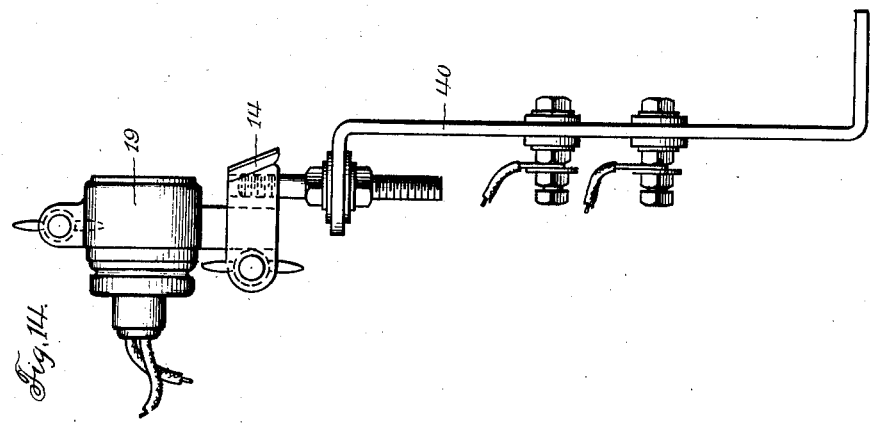
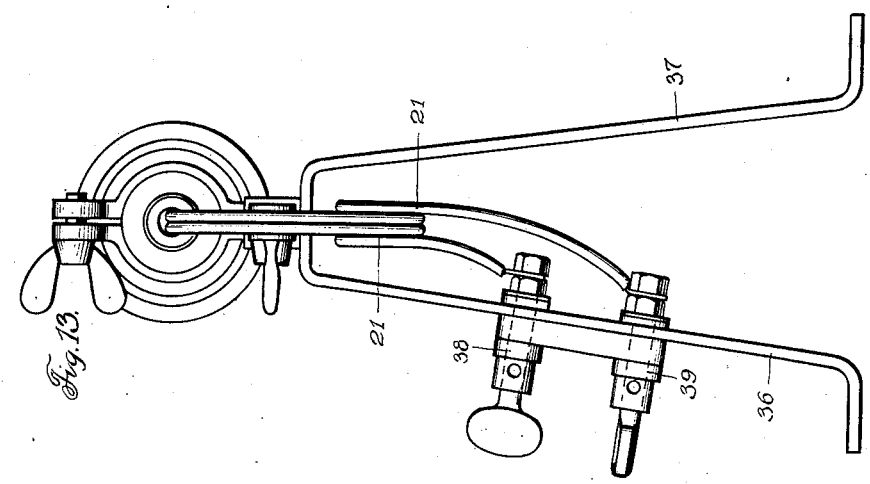
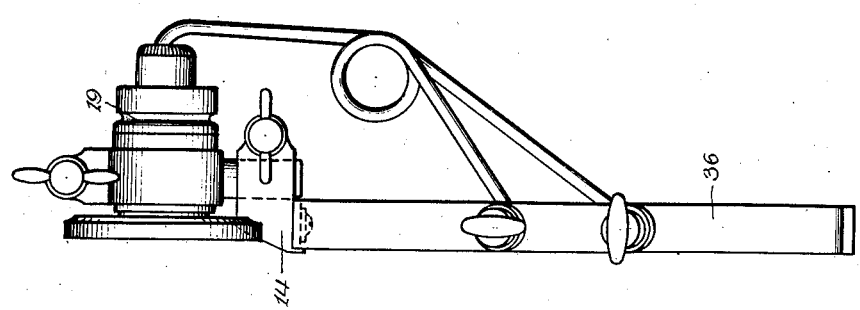

Patented Apr. 20, 1926.

1,581,926

UNITED STATES PATENT OFFICE.

LEE B. JONES, EARL W. JONES, AND EDWARD H. WERZNER, OF EVANSVILLE, INDIANA, ASSIGNORS TO SUNBEAM ELECTRIC MANUFACTURING COMPANY, OF EVANSVILLE, INDIANA, A CORPORATION OF INDIANA.

HEADLIGHT.

Application filed August 5, 1920. Serial No. 401,536.

*To all whom it may concern:*

Be it known that we, LEE B. JONES, EARL W. JONES, and EDWARD H. WERZNER, citizens of the United States, all residing at Evansville, in the county of Vanderburg and State of Indiana, have invented certain new and useful Improvements in Headlights, of which the following is a full, clear, concise, and exact description, reference being had to the accompanying drawings, forming a part of this specification.

Our invention relates to headlights and it has particular relation to a device of the character designated wherein the number of the parts required to secure efficient operation are reduced to a minimum and at the same time means are provided whereby the structure is quite strong, irrespective of the necessary light weight of some of the parts employed.

In headlights the reflector is usually so formed that it is of exceptionally light weight. It is, however, necessary to secure the reflector to a headlight casing in such manner that it does not yield to the shocks and jars which are common to the vehicle upon which the headlight is mounted. It is essential, therefore, to secure the headlight reflector to a heavy iron portion of the casing.

In the headlights heretofore employed the removal of the reflecting surface has been a matter of considerable difficulty because of the manner in which it was secured to the casing.

One object of our invention, therefore, is to provide means whereby the reflector with its associated lamp, contacts, and leads therebetween, may be bodily withdrawn as a unit from the casing in which it is positioned. The provision of such means, results in the elimination of any possibility of bending or otherwise damaging the copper, silver-plated reflector. Moreover, the interior of the casing is made easily accessible for purposes of repair, cleaning and adjustment.

Another object of our invention is to so position cooperative contacts on the reflector structure and on the casing that electrical contact will be made between the two when the reflector is properly positioned in the casing. This provision eliminates the necessity for working with the wiring leads in the interior of the headlight casing. This effects a very simple arrangement whereby necessary repairs may be made inasmuch as it is only necessary to bodily withdraw the reflector unit and thereafter make the necessary adjustments.

By employing an automatic contact of the character just described, a firm contact is ensured at all times. No amount of movement due to vibration, whether vertical or horizontal, can do more than simply improve the conducting relation between the movable contact on the reflector unit and the stationary contact of the casing. In accomplishing this object we provide spring contacts which register positively and accurately with conducting straps when the reflector unit is inserted in the casing. These spring contacts perform the additional function of maintaining the reflector unit in the proper position after it has been placed in the casing.

The above described reflector unit is preferably placed in the casing through the front door of the casing. The contacts just referred to are so positioned with respect to the casing and the reflector unit that the electrical contact between the two, and consequent connection of the headlight lamp to a source of energy, will not be effected unless the reflector unit is pushed entirely home and the door allowed to close. A safety provision is thus embodied in the structure heretofore mentioned.

Still another object of our invention is to provide a lamp support which is secured to the reflector unit and which comprises means whereby the lamp may be adjusted in a plurality of planes. This admits of proper focusing of the lamp when desired. Such means comprise a lamp-supporting post which has a portion formed thereon whereby the reflector itself may be adjusted. This latter portion may conform to the curvature of the reflector and by means of the particular securing means by which the light standard is mounted upon the reflector unit, admits of adjustment of the reflector itself.

The latter provision is of particular advantage in headlights when used upon locomotives, for the reason that the headlight supports in such cases frequently become disarranged and therefore inaccurate. In order to throw the light beam upon the track in the desired location, it is essential that means be provided whereby the headlight reflector may be tipped independently of the headlight supports proper.

While we have other objects in view these will be more clearly understood by reference to the hereinafter description of our invention together with the accompanying drawings, in which:

Fig. 3 is an elevational view, partly in section and with portions broken away taken from the front of the headlight, the latter being tipped outwardly substantially 45°, and the reflector being removed from its seat in the platform and illustrates the manner in which the reflector unit slides into and out of the casing along ledges;

Figs. 4 and 5 are fragmentary, elevational and plan views, respectively, of the lower portion of the headlight casing, illustrating the manner in which the ledges are formed and in which the platform is adjustably held in position.

Fig. 6 is a fragmentary, sectional, elevational view of one corner of the door illustrating the manner in which the glass front is secured therein and, to some extent, showing the sheet metal construction thereof;

Fig. 7 is a fragmentary, elevational, sectional view of one corner of the side-number light housing, illustrating the manner in which the door thereof is held closed;

Fig. 8 is an elevational, sectional view of the headlight unit taken through the center thereof;

Figure 1:
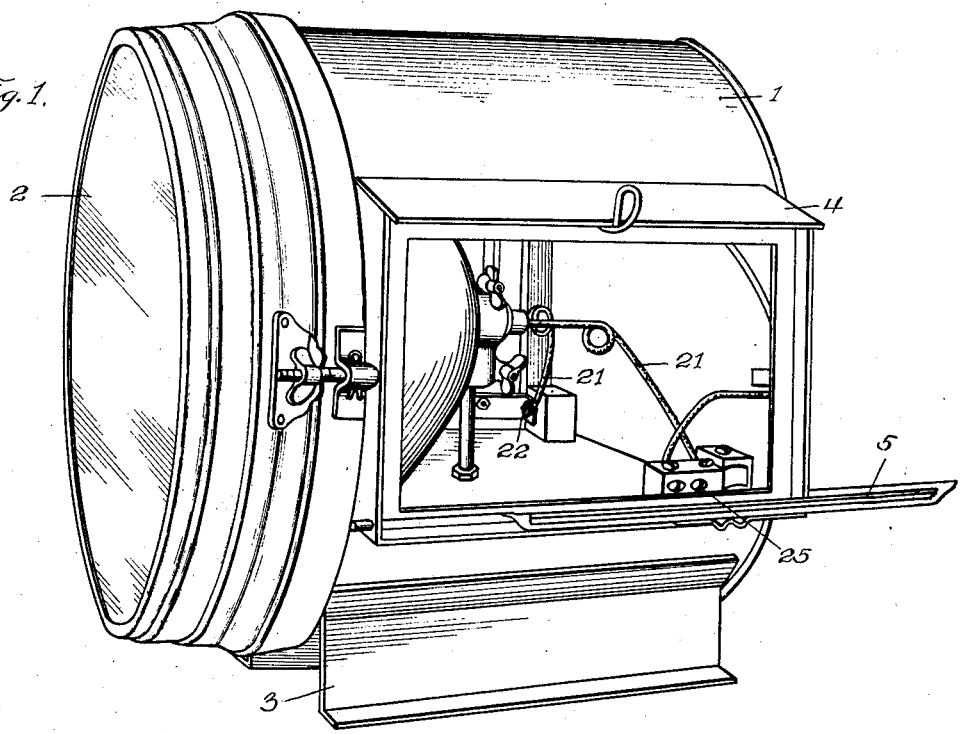
Fig. 1 is a perspective view of a headlight embodying our invention, the front glass door thereof being closed while the side number door is open to permit a view of the interior of the headlight.
Figure 2:
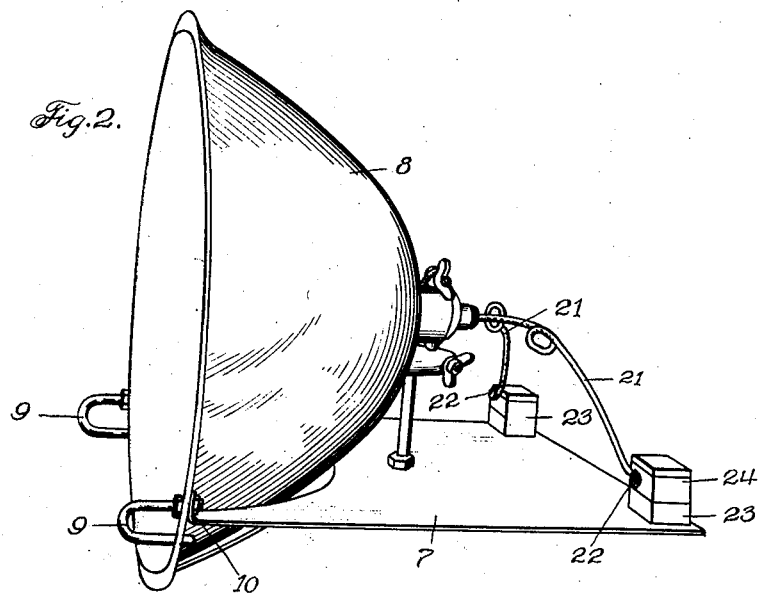
Fig. 2 is a perspective view of the reflector mounted upon its associated platform and illustrates the extent of the unit which may be bodily withdrawn from the interior of the headlight casing.

Fig. 8$^a$ is a fragmentary plan view illustrating the manner in which a certain element in Fig. 8 is made adjustable;

Fig. 9 is a fragmentary plan view illustrating in detail the movable and stationary contact blocks;

Fig. 10 is an elevational view of a lamp standard having means whereby a lamp may be placed in an upright position in the reflector;

Fig. 11 is a view taken from the right side of Fig. 10;

Figs. 12 and 13 are elevational side and front views, respectively, of another form of lamp standard which we may employ; and Fig. 14 is a side elevational view of still another lamp standard which may be found advantageous in the aforesaid construction.

Referring to the drawings, a headlight comprises a casing 1 which is substantially cylindrical in form, being closed at the back thereof by a wall and at the front by a door 2. Feet 3 are preferably welded to the casing to provide a support therefor on a locomotive or otherwise. Side number housings 4 are formed in the sides of the casing and are closed by side number doors 5. In the interior of the casing are slideways or ledges 6—6, which extend from the front to the rear of the casing, and are adapted to support a platform 7 which may slide into and out of the casing on said ledges, being supported thereby entirely within the casing.

Referring now to Figs. 3, 4, and 5, the ledges 6 are formed at the upper edges of a cradle-like structure comprising arcuate strips 6$^a$, joined by cross pieces 6$^b$, said ledges extending along the upper edges of these strips and the cradle being secured in the bottom of the casing. The strip 6$^a$ at the front of the casing (Figs. 4 and 5) extends upwardly beyond the ledges on each side, as at 6$^c$, and the cradle as a whole is secured to the casing in such manner that the portions 6$^c$ may be bent inwardly to engage the forward portions of the side edges of the platform 7. This feature is of advantage in that it permits the rigid maintenance of the platform in position, should the ledges become worn or the platform itself be slightly under dimensions and therefore loose in the ledges.

A curved reflector 8 is mounted on the platform 7 by means of hooks 9—9 which extend through the edge of said reflector and are bolted thereto, and to up-turned lugs 10—10 formed integrally with the platform 7. It will be noted that the point of attachment of the last two lugs is somewhat below the axis of the reflector.

Another support for said reflector is provided by a post 11, which is mounted upon the platform 7. The position of the reflector with respect to the platform may be adjusted by means of lock-nuts 12 and 13 through a portion 14 which conforms to the curvature of the reflector. A brace 15 extends from the bottom of the reflector to the platform where it is connected to the point at which the post 11 is supported and, as may be seen, is there secured to the lock-nut 13. The eye 15$^a$ at the end of the brace 15, through which the post 11 passes, is slotted at 15$^b$ to permit of the movement of the latter therein when it is desired to tilt the reflector. The position of this slotted eye with respect to the post 11 is more clearly shown in the fragmentary plan view of Fig. 8$^a$ when it is desired to adjust the reflector around the two edge points which are connected substantially in the plane of the frame 7, the nut 13 is loosened and the member 15 moved between the limits provided by the elongated slot 15ᵇ in the eye 15ᵃ.

The part 14 is provided with a pair of jaws 16 which are adapted to grasp a stud 17 on which is carried another set of jaws 18 the latter in turn grasping the lamp socket 19 in which a lamp 20 is positioned. By means of the angularly-disposed adjustment jaws, the lamp 20 may be focussed through movement in a plurality of planes.

Leads 21—21 connect the lamp socket to binding posts 22—22 on contact blocks 23—23 which are secured to the platform 7 at the rear end thereof. Straps 24 are secured to the contacting blocks 23—23 and are in electrical contact with the binding post 22. It will be observed that these straps provide an extensive contacting surface.

Secured to the casing 1 are contact blocks 25, to which are secured spring contact members 26 which are electrically associated with binding posts 27 whence leads 28 connect to a source of supply. The resiliency of the contacts 26 is such that they extend into the path of the contact blocks 23 when the latter are moved into the casing of the platform 7. As the platform reaches its proper position a considerable wiping contact is made between the straps 24 and the spring contacts 26, thereby automatically connecting the lamp to the source of energy. Of course, we wish it understood that the switching control of the lamp is had within the cab of the locomotive upon which the headlight is used.

It will be observed that the entire interior of the head-light may be withdrawn as a unit by simply opening the door and pulling upon the hooks 9—9. Inasmuch as the hooks are directly connected to the lugs 10 or the heavy platform 7 the reflector 8 is not bent out of shape by the movement thereof. These lugs also serve as two supports for the reflector while the post 11 provides the third support for a three-point suspension. Again, as above pointed out, the reflector itself may be adjusted to throw the light in any desired location upon the track by manipulation of the nuts 12 and 13 whereupon the part 14 moves the reflector relative to the platform. This method of adjustment is extremely advantageous in that it permits the light beam to be moved independently of the casing whereby the latter may be permanently secured to the locomotive and not rendered insecure by frequent change of position.

The automatic switch which we have just described and which is, in part, a portion of the reflector unit, not only functions to provide a very efficient contact between the spring contacts 26 and the straps 24, irrespective of the vibration of the headlight, but at the same time registers positively and accurately in such manner that the platform, when inserted, is centrally positioned irrespective of the wear of the slide rails or ledges.

Figs. 10 and 11 illustrate a lamp standard which is advantageous when it is desired to mount a light in an upright position within the reflector. In this case, the socket 19 is mounted on, or screwed into, a stud 29 which is grasped by jaws 30 so that it may move either to the right or left, or pivotally about the jaws 30. The jaws 30 are supported by a stud 31 which is, in turn, positioned in jaws 32, thus allowing desirable adjustment. The latter jaws are associated with an upright member 33 which is secured to a base 34, the latter being held in position upon the platform 7. The leads 21—21 are secured to a binding member 35 which prevents their being jarred about inside the headlight casing and from probably working loose from the contact-block binding posts.

Figs. 12 and 13 illustrate another modification of lamp standard which we may employ. The socket 19 is positioned as hereinbefore described, and the portion 14 conforming to the curvature of the reflector is likewise used. The supporting member, however, comprises two legs 36 and 37, one of which has mounted thereupon binding posts 38 and 39 whereby the leads 21—21 may be secured.

Fig. 14 illustrates still another modification of binding posts, in this instance, the post 40 being of Z formation. All of the other features are analogous to those hereinbefore described in connection with the other posts.

In Fig. 6 we have illustrated the manner in which a glass 41 is secured in the door 2 of our headlight. It will be observed that an annular frame 42 is provided with a screw-eye through which a screw 43 passes. On the interior of the frame an angle member 44 has one side 45 pressing against the glass. The other side of the angle member which is parallel to the annular frame 42 is slotted as at 46 whereby it may be moved to accommodate any desired thickness of glass and thereby maintain said glass rigidly in position by tightening a nut 47 against a washer 48, the latter engaging the sides of the slot 46.

The side number door 5 is held in its closed position by a lock 49 which is urged inwardly by a spring 50. This simple form of device provides a very satisfactory latch for the side number doo 5.

While we have specifically described our invention, it is obvious that many modifications therein may occur to those skilled in the art and we desire, therefore, that our invention be interpreted broadly and limited only by the scope of the prior art and by the appended claims.

Having thus described our invention, what we claim as new and desire to secure by Letters Patent is:

1. In a headlight, a substantially cylindrical casing, a reflector, a platform removably positioned in said casing and upon which said reflector is positioned, said platform being cutaway to conform to the contour of said reflector, said reflector being slightly offset from the edge of the cutaway portion to permit adjustment between the reflector and the platform, means for supporting the edges of said reflector substantially in the plane of said platform, and means for further supporting an edge of said reflector at a point below said plane.

2. In a headlight, a cylindrical casing, a reflector, a platform removably positioned in said casing and upon which said reflector is mounted, said platform being between the axis and the bottom edge of said reflector and extending substantially parallel to the axis of said reflector, supporting means for supporting a lamp at three points also carried by said platform, and means comprising contacts mounted on the walls of the cylindrical casing whereby said lamp is connected to a source of energy when said platform is pushed into position.

3. In a headlight, a substantially cylindrical casing, a reflector, a platform removably positioned in said casing and upon which said reflector is positioned, said platform being cutaway to conform to the contour of said reflector, said reflector being slightly offset from the edge of the cutaway portion to permit adjustment between the reflector and the platform, means for supporting the edges of said reflector substantially in the plane of said platform, and bracket, means attached to said platform for further supporting said reflector at substantially its lowest point, said bracket being movable to tilt said reflector about the first mentioned points of support.

4. In a headlight, a casing, a reflector, a platform having a cutaway portion conforming to said reflector, and means for securing said reflector to said platform comprising devices securing the edge of said reflector directly to the adjacent platform portions and other devices for securing the edge of the reflector to a remote point on said platform.

5. In a headlight, a casing, a reflector, a platform having a cutaway portion conforming to said reflector, and means for securing said reflector to said platform comprising devices securing the edge of said reflector directly to the adjacent platform portions and a bracket having one end secured to the platform and the other end supporting said reflector edge.

6. In a headlight, a casing, a reflector, a platform having a cutaway portion in which said reflector seats, a post on said platform, said reflector being supported at two edge points by said platform and near the center thereof by said post, and means for withdrawing said platform and reflector bodily from said casing.

7. In a headlight, a casing, a reflector, a platform having a cutaway portion in which said reflector seats and a post on said platform embodying a portion conforming to said curved reflector and partially supporting the same, said reflector also being edge-supported at two other points by said platform.

8. In a headlight, a casing, a curved reflector, a platform having a cutaway portion in which said reflector seats, a post on said platform embodying a portion conforming to said curved reflector and partially supporting the same, said reflector also being edge-supported at two other points by said platform, and means whereby the position of said reflector with respect to said platform may be adjusted.

9. In a headlight, a casing, a curved reflector, a platform having a cutaway portion in which said reflector seats, a post on said platform embodying a portion conforming to said curved reflector and partially supporting the same, said reflector also being edge-supported at two other points by said platform, and means for moving said post to tilt said reflector about its edge supports whereby the position of said reflector with respect to said platform may be adjusted.

10. In a headlight, a casing, a curved reflector, a cutaway supporting platform movable into and out of said casing, means for securing said reflector in the cutaway portion of said platform, electrical contacts on said casing, contact blocks on either side of said casing embodying a binding post and a spring contact in conducting relation thereto, and cooperative contact blocks on said platform embodying a binding post and a contact member projecting into the path of said first named contact and adapted to be engaged in wiping contact thereby when said platform is inserted in said casing.

11. In a headlight, a casing, a cradle-like member positioned in the latter comprising arcuate strips conforming to the bottom portion of said casing, cross-pieces joining said strips, and ledges along the upper edges of said cross pieces, a reflector supporting platform adapted to be positioned on said ledges, and means comprising the ends of one of said strips for grasping the side edges of said platform to maintain the same.

12. In a headlight, a casing, a cradle-like member positioned in the latter comprising arcuate strips conforming to the bottom portion of said casing, cross members joining said strips, and ledges at the upper edges of said cross members, and a reflector-supporting platform adapted to be positioned on said ledges, the ends of the outer arcuate strip extending upwardly beyond said ledges and being bendable to grasp the edges of the platform when the latter is positioned in said ledges.

13. In a headlight, a casing, a reflector, a supporting platform for said reflector positioned between the axis and the lower edge of the latter and directly secured thereto at the edges thereof, a post mounted on said platform and supporting said reflector near the middle thereof, and a brace attached to said platform and said reflector.

14. In a headlight, a casing, a reflector, a supporting platform for said reflector positioned between the axis and the lower edge of the latter and directly secured thereto at the edges thereof, a post mounted on said platform and supporting said reflector near the center thereof, means for securing said post to said platform, and a brace attached to said platform by said post-securing means for supporting the bottom of the reflector.

15. In a headlight, a casing, a reflector, a supporting platform for said reflector attached to the latter between the axis and the edge thereof, a post adjustably mounted on said platform and having means for supporting a lamp in said reflector, a bracket for supporting said reflector, and means associated with said post for allowing adjustment of the bracket to vary the position of the reflector.

16. In a headlight, a casing, a reflector, a cutaway supporting platform for said reflector attached to the latter between the axis and the edge thereof, a post adjustably mounted on said platform and having means for supporting a lamp in said reflector, a bracket for supporting said reflector, said bracket having an elongated eye which surrounds the lower end of said post, and locking means for securing said post in predetermined position and for locking, at the same time, said bracket to secure said reflector in desired position with respect to said lamp.

In witness whereof, we have hereunto subscribed our names.

LEE B. JONES.
EARL W. JONES.
EDWARD H. WERZNER.